(12) United States Patent
Barberis et al.

(10) Patent No.: US 7,630,470 B2
(45) Date of Patent: Dec. 8, 2009

(54) METHOD FOR MAKING A FLAT ZIRCONIUM ALLOY PRODUCT, RESULTING FLAT PRODUCT AND FUEL, ASSEMBLY COMPONENT FOR NUCLEAR POWER PLANT REACTOR MADE FROM SAID FLAT PRODUCT

(75) Inventors: Pierre Barberis, Ugine (FR); Claude Simonot, L'Aigle (FR)

(73) Assignee: Compagnie Europeenne du Zirconium-Cezus, Courbevoie (FR)

( * ) Notice: Subject to any disclaimer, the term of this patent is extended or adjusted under 35 U.S.C. 154(b) by 0 days.

(21) Appl. No.: 10/565,481

(22) PCT Filed: Jul. 20, 2004

(86) PCT No.: PCT/FR2004/001923

§ 371 (c)(1),
(2), (4) Date: Jan. 20, 2006

(87) PCT Pub. No.: WO2005/021818

PCT Pub. Date: Mar. 10, 2005

(65) Prior Publication Data

US 2006/0215806 A1 Sep. 28, 2006

(30) Foreign Application Priority Data

Jul. 31, 2003 (FR) .................................. 03 09474

(51) Int. Cl.
*G21C 1/04* (2006.01)
(52) U.S. Cl. ..................... 376/347; 376/377; 376/434; 148/672; 148/421; 420/422
(58) Field of Classification Search ................ 148/672, 148/421, 565, 668, 407; 376/457, 260, 900, 376/347, 377, 434; 420/422
See application file for complete search history.

(56) References Cited

U.S. PATENT DOCUMENTS

| | | | |
|---|---|---|---|
| 3,336,201 A * | 8/1967 | Graham et al. ............... 376/267 |
| 3,776,508 A * | 12/1973 | Katz ........................... 252/640 |
| 3,865,635 A * | 2/1975 | Hofvenstam et al. ........ 148/672 |
| 4,017,368 A | 4/1977 | Wax et al. |
| 4,383,853 A | 5/1983 | Zapffe |
| 4,450,016 A * | 5/1984 | Vesterlund et al. .......... 148/672 |
| 4,450,020 A * | 5/1984 | Vesterlund .................. 148/672 |
| 4,584,030 A * | 4/1986 | McDonald et al. .......... 148/281 |
| 4,595,413 A | 6/1986 | Hard et al. |
| 4,604,148 A | 8/1986 | Anderson |
| 4,764,223 A * | 8/1988 | Charquet et al. ............ 148/672 |
| 4,938,921 A * | 7/1990 | Mardon et al. .............. 376/457 |
| 5,242,515 A * | 9/1993 | Worcester et al. ........... 148/672 |
| 5,297,177 A * | 3/1994 | Inagaki et al. ............... 376/462 |
| 5,304,261 A * | 4/1994 | Yamamoto et al. .......... 148/519 |
| 5,310,431 A | 5/1994 | Buck |
| 5,487,797 A * | 1/1996 | Dumas et al. ............... 148/672 |
| 5,618,502 A | 4/1997 | Byers et al. |
| 5,681,404 A * | 10/1997 | Adamson et al. ............ 148/421 |
| 5,735,978 A * | 4/1998 | Mardon et al. .............. 148/672 |
| 5,876,524 A * | 3/1999 | Andersson .................. 148/672 |
| 6,554,179 B2 | 4/2003 | Horner et al. |
| 6,699,398 B1 | 3/2004 | Kim |

FOREIGN PATENT DOCUMENTS

| | | |
|---|---|---|
| EP | 0 647 724 | 4/1995 |
| EP | 0 795 618 | 9/1997 |
| FR | 2 303 865 | 10/1976 |
| FR | 2 673 198 | 8/1992 |
| JP | 09 257988 | 10/1997 |
| WO | WO 97/40659 | 11/1997 |

OTHER PUBLICATIONS

Erich Tenckhoff, *Deformation Mechanisms, Texture, and Anisotropy in Zirconium and Zircaloy*, ASTM Special Technical Publication, Philadelphia, PA, 1998, pp. 31 to 32 and 53 to 54.
Jean Luc Aubin, Pierre Montmitonnet, and Sandrine Mulot, "Zirconium Alloy Cold Pilgering Process Control by Modeling," Zirconium in the Nuclear Industry: Twelfth Symposium. 2000, pp. 460 to 481.

\* cited by examiner

*Primary Examiner*—Rick Palabrica
(74) *Attorney, Agent, or Firm*—Davidson, Davidson & Kappel, LLC (57) ABSTRACT

A method of fabricating a zirconium alloy flat product, the method being characterized by: preparing or casting a zirconium alloy ingot containing at least 95% by weight of zirconium, and including the usual impurities and alloying elements; shaping said ingot in order to obtain a flat product; subjecting said flat product to a β quenching operation under conditions that are determined to obtain within the flat product an acicular structure at the end of said β quenching; subjecting said flat product, after the β quenching, to a rolling operation performed in a single rolling sequence without intermediate annealing, said rolling being performed at a temperature lying in the range ambient to 200° C., and having a reduction ratio lying in the range 2% to 20%; and subjecting said rolled flat product to an annealing treatment in the a range or in the α+β range, performed in the temperature range 500° C. to 800° C. for 2 minutes to 10 hours. A zirconium alloy flat product as obtained by the method, and a fuel assembly element for a power station nuclear reactor obtained by shaping the product.

14 Claims, 5 Drawing Sheets

Calculated pole figure 002  Calculated pole figure 100

FIG.4a

Calculated pole figure 002  Calculated pole figure 100

METHOD FOR MAKING A FLAT ZIRCONIUM ALLOY PRODUCT, RESULTING FLAT PRODUCT AND FUEL, ASSEMBLY COMPONENT FOR NUCLEAR POWER PLANT REACTOR MADE FROM SAID FLAT PRODUCT

FIELD OF THE INVENTION

The invention relates to fabricating zirconium alloy flat products, used in particular for fabricating parts that are themselves used in fuel assemblies for light water reactors of nuclear power stations.

BACKGROUND INFORMATION

The parts used in making up fuel assemblies for light water reactors for nuclear power stations, in particular boiling water reactors, and that need to present low capacity to absorb neutrons, are made of a zirconium alloy that may also contain, amongst other ingredients, significant quantities of elements such as Nb, Sn, Fe, Cr, and Ni. The alloy classes known as "Zircaloy 2" and "Zircaloy 4" are the classes that are used for the most part. Zircaloy 2 contains the following elements (where concentrations are expressed here and throughout the description below as percentages by weight):
Sn: 1.2% to 1.7%;
Fe: 0.07% to 0.20%;
Cr: 0.05% to 0.15%;
Ni: 0.03%-0.08%;
O: 900 parts per million (ppm) to 1600 ppm.

Zircaloy 4 contains the same elements with the exception of nickel, and its Fe content may lie in the range 0.18% to 0.24%. Other Zircaloy 2 type alloy classes can be used having higher contents of Fe and/or Cr and/or Ni, as can other alloys containing 0.5% to 2% Sn, 0.5% to 2% Nb; and 0.1% to 0.5% Fe, or 0.5% to 2% Sn, 0.1% to 1% Fe, and 0.1% to 1.2% Cr, or 1.5% to 3.5% Nb and 0.5% to 2% Sn. Such alloys can also contain other added elements, in addition to the usual impurities.

A particularly important part of the reactor made using such alloys is the box in which the fuel-containing tubes are installed. This box must have excellent ability to withstand corrosion, and also great dimensional stability under irradiation. However the alloys in most widespread use for making the sheets from which such boxes are built present properties of growing under irradiation that prevent the burnup fraction of the reactor being as high as would be desirable. This irradiation growth is directly associated with the usually highly anisotropic texture of the flat product from which such boxes are made.

Other important parts made from such flat products are the grids of pressurized or boiling water reactors, and the central tubes defining the water circulation paths.

The flat products (sheet or strip) from which such parts are made must also possess mechanical properties ensuring that they have good capacity for being shaped.

Proposals for improving methods of fabricating sheets for boxes are described in documents EP-A-0 835 330 and EP-A-0 795 618.

EP-A-0 835 330 describes the preparation of a sheet from a zirconium alloy having strictly controlled contents of certain volatile impurities, namely 0.5 ppm to 10 ppm of Cl, 5 ppm to 20 ppm of at least one element selected from Mg, Ca, Na, and K, 100 ppm to 270 ppm of C, 50 ppm to 120 ppm of Si, and 1 ppm to 30 ppm of P. After operations for obtaining the starting sheet, including in particular β quenching when the sheet is at its final or almost final thickness, annealing heat treatment is performed after β quenching at a temperature in the range 600° C. to 800° C. in a static oven or in the range 700° C. to 800° C. in a continuous oven. After this step, the operations of bending the sheet to fabricate the box are performed. In particular because of the specified content of volatile impurities and the conditions of the β quenching, an acicular (needle-shaped) structure is obtained of the so-called "basketweave" type (i.e. presenting a basket-like pattern), with care being taken during the subsequent heat treatment not to eliminate that structure. This produces a sheet presenting good ductility and little propensity to crack during forming operations, but without degrading its properties of withstanding corrosion.

EP-A-0 795 618 describes zirconium alloy sheet that experiences little irradiation growth, containing no more than 5% Sn and/or no more than 5% Nb and at least 90% Zr, with crystal orientation of <0001> in the long direction FL lying in the range 0.2 to 0.35, and presenting a difference ΔFL in the FL values between the middle in the width direction and the end in the long direction of the sheet that is less than or equal to 0.025. Those sheets are obtained after β quenching, during which temperature differences between the faces of the sheet during the heating stage of the β quenching operation are minimized as much as possible. Such sheets, therefore, have particular isotropic crystal orientations producing effects of reduced irradiation growth.

Nevertheless, it turns out that those methods do not enable flat products to be produced that possess excellent properties of deformability, from the bending and stamping points of view. Such properties are essential, however, to make it easier to obtain boxes under good conditions.

SUMMARY

The objective of the invention is to propose a method of fabricating zirconium alloy flat products that present both good mechanical properties and low irradiation growth such that the flat products can be used effectively in particular, but not exclusively, in fabricating boxes for boiling water nuclear reactors.

To this end, the invention provides a method of fabricating a zirconium alloy flat product, the method being characterized by:
preparing or casting a zirconium alloy ingot containing at least 95% by weight of zirconium, and including the usual impurities and alloying elements;
shaping the ingot in order to obtain a flat product;
subjecting the flat product to a β0 quenching operation under conditions that are determined to obtain within the flat product an acicular structure at the end of said β quenching;
subjecting the flat product, after the β quenching, to a rolling operation performed in a single rolling sequence without intermediate annealing, said rolling being performed at a temperature lying in the range ambient to 200° C., with a reduction ratio lying in the range 2% to 20%; and
subjecting the rolled flat product to an annealing treatment in the α range or in the α+β range, performed in the temperature range 500° C. to 800° C. for 2 minutes (min) to 10 hours (h).

The proportions by weight of the main elements of the alloy may be: Sn=1.2%-1.7%; Fe=0.07%-0.20%; Cr=0.05%-0.15%; Ni=0.03%-0.08%; O=900 ppm-1600 ppm in an exemplary embodiment.

The proportions by weight of the main elements of the alloy may be: Sn=1.2%-1.7%; Fe=0.18%-0.24%; Cr=0.05%-0.15%; O=900 ppm-1600 ppm in another exemplary embodiment.

The proportions by weight of the main elements of the alloy may be: Sn=0.5%-2%; Nb=0.5%-2%; Fe=0.1%-0.5% in another exemplary embodiment.

The proportions by weight of the main elements of the ally may be: Sn=0.5%-2%; Fe=0.1%-1%; Cr=0.1%-1.2% in another exemplary embodiment.

The proportions by weight of the main elements of the alloy may be: Nb=1.5%-3.5%; Sn=0.5%-2% in another exemplary embodiment.

The rolling after β quenching may be performed with a reduction ratio of 5% to 16%, and within a ratio of 5% to 10%.

The β quenching may be cooled at a rate of 1° C. per second (° C./s).

The invention also provides a zirconium alloy flat product characterized in that it is obtained by the above method.

The invention also provides a fuel assembly element for a light water reactor of a nuclear power station, characterized in that it is obtained by shaping a flat product of the above type.

It may constitute a box for a boiling water nuclear reactor.

It may constitute a grid for a boiling water reactor.

It may constitute a grid for a pressurized water reactor.

It may consist in a central tube defining water circulation paths.

As will be understood, the invention provides a method of fabricating a zirconium alloy flat product adapted to obtaining an intermediate structure that is partially recrystallized, that is duplex, equiaxed, and acicular including a step of rolling cold (or at moderately high temperature), that occurs between β quenching and annealing performed in the α or the α+β domain.

In the method of EP-A-0 835 330, the β quenched raw structure is generally a coarse structure having large ex-β grains lying in the range 50 micrometers (μm) to 500 μm. They are little oriented, their texture is very marked, with very high peaks in pole figures, properties that present good isotropy, and privileged crystal orientations. It appears that it is that microstructure of large ex-β grains with very marked texture that is at the origin of the difficulties in shaping the sheets. α annealing or α+β annealing has no influence on that microstructure.

The inventors have imagined that an arrangement of crystals that is more random and less marked could lead to comparable isotropy for mechanical properties, thereby conserving properties that are good in terms of irradiation growth, while also being advantageous concerning mechanical properties.

A structure has been obtained by rolling cold or at moderately high temperature prior to α or α+β annealing, where the rolling breaks the acicular structure and the grains that are present after the β quenching, and thus enables the texture to be softened, making it less marked, with peaks that are not so high, with properties presenting isotropy that might be a little less, but with orientations that are more random. The following α or α+β annealing generates recrystallization which leads to a texture in which isotropy is only slightly degraded, but with a microstructure presenting a mixture of equiaxed and needle grains. The microstructure is fine, which is favorable for the deformability of the material.

It also turns out that the roughness of the flat product is halved, thereby improving the thermohydraulic performance of finished products, and also their stamping properties.

In the invention, the cold rolling occurs at a temperature in the range ambient to 200° C. It is performed with a reduction ratio of 2% to 20% (such as in the range 5% to 15%, or in the range 5% to 10%). This reduction ratio can be obtained in one or more rolling passes, but necessarily in a single rolling sequence, i.e. without any intermediate annealing between the various passes. One or more intermediate anneals would impede or prevent recrystallization during the α or α+β annealing.

The anneal performed after cold rolling in accordance with the invention is performed at a temperature in the range 500° C. to 800° C., i.e. either in the α domain or in the α+β domain of the alloy. The lowest temperatures of this range are particularly suitable for alloys having a content of Nb that is high (greater than about 0.3%). The duration of the annealing depends on the amount of deformation to which the product has been subjected during rolling and on the type of annealing installation (which may be continuous or static).

BRIEF DESCRIPTION OF THE DRAWINGS

The invention can be better understood with the help of the following description given with reference to the following accompanying figures:

FIG. 4 illustrates the pole figures of a sample in the raw β quenched state (FIG. 4a) and after cold rolling with a 16% reduction ratio and annealing (FIG. 4b).

FIG. 5 illustrates examples of the metallurgical structure in polarized light of zirconium alloy samples after final annealing, in which one of the samples was subjected to two cold rolls with intermediate annealing (FIG. 5a), while the other sample was subjected to a single cold roll in accordance with the invention (FIG. 5b); and FIG. 6 illustrates the pole figures for these two samples (FIGS. 6a and 6b respectively).

DETAILED DESCRIPTION

To implement the invention, the method begins by preparing a zirconium alloy flat product using conventional steps of melting an ingot, generally forging the ingot, hot rolling, where appropriate in a plurality of passes optionally separated by heat treatments, generally one or more cold rolling and annealing operations, and finally β quenching of the resulting material; and then cold rolling and annealing are performed in accordance with the invention.

The composition of the alloy may correspond, in its main elements, to all kinds of zirconium alloy classes conventionally used for making fuel assembly elements for nuclear reactors, in particular boxes for boiling water reactors. Examples of such classes are defined in the introduction to the present description. In general, the invention is applicable to zirconium alloys containing at least 95% zirconium. With less than 95%, there is a high risk of not obtaining the looked-for structures and properties.

For all of these alloy classes, the result of the β quenching is to obtain an acicular structure. Depending in particular on the levels of impurities that are present, the structure may present a basketweave pattern that is marked to a greater or lesser extent. However such a pattern is not particularly sought after in the method of the invention, since in any event the following cold rolling modifies the structure considerably by breaking up the acicular structure.

Figure 1:
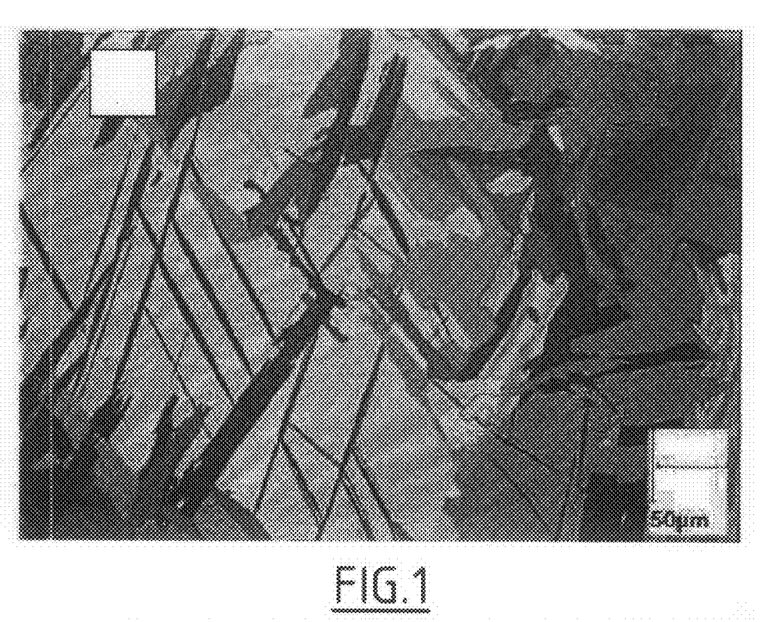
FIG. 1 illustrates an example of the metallurgical structure in polarized light of a zirconium alloy sample after β quenching.

FIG. 1 shows the microstructure of a Zircaloy 4 sample having the following composition:
Sn=1.44%;
Fe=0.21%;
Cr=0.11%;
O=0.12%;
Si=40 ppm, with the balance being Zr and the usual impurities, obtained from an ingot having a diameter of 660 mm and after being subjected to conventional shaping treatments (forging to a thickness of 100 mm, hot rolling to a thickness of 5 mm, annealing and a plurality of cold rolling and annealing cycles giving it a thickness of 2.50 mm, and β quenching performed by infrared heating up to a maximum temperature of 1110° C., maintaining in β phase for 93 s, and cooling at a rate of 2° C./s to 5° C./s down to ambient temperature.

It can be seen that this microstructure is typical of a state following β quenching, with a mixture of parallel platelets and of basketweave. In the example shown, there can also be seen numerous twins, but that can come from the process of preparing the samples or from the coiling that followed the β quenching.

Figure 2:
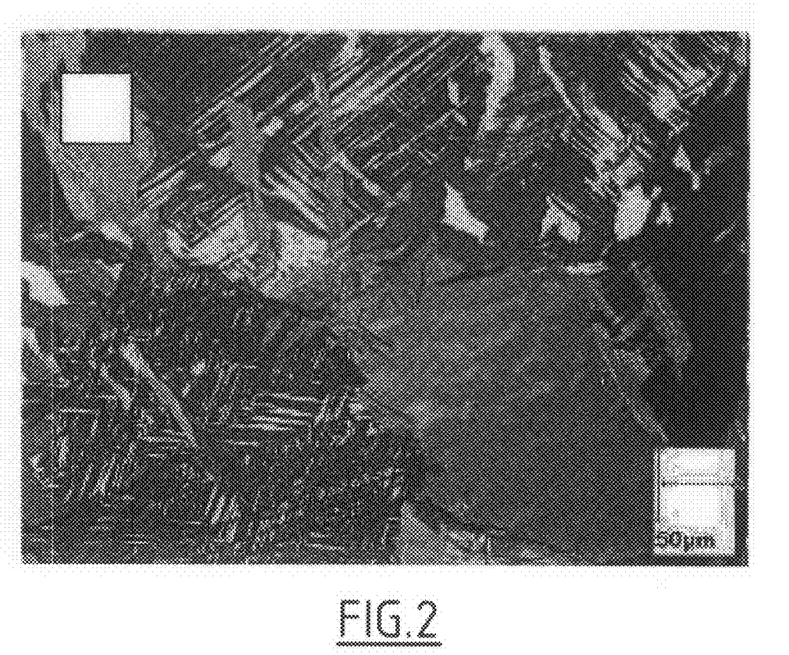
FIG. 2 illustrates the sample in the same manner after cold rolling.

FIG. 2 illustrates the sample of the same β quenched metal after being subjected to cold rolling in accordance with the invention performed at ambient temperature with a reduction ratio of 12% in one pass. The cold rolling serves to break the needles of the initial structure and to increase the number of twins.

Figure 3:
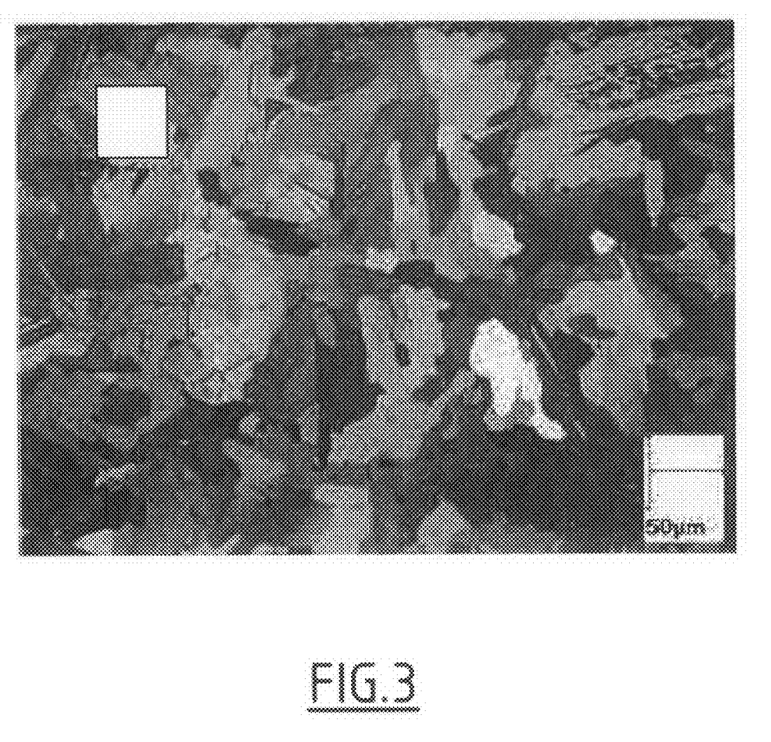
FIG. 3 illustrates the sample in the same manner after cold rolling and annealing, i.e. after being subjected to all of the steps of the method of the invention.

FIG. 3 illustrates a sample of the same β quenched metal, cold rolled at 12% and annealed at 700° C. for 1 h (α anneal). Partial recrystallization has taken place increasing the number of equiaxed grains (with this increase itself being greater when the reduction ratio is higher), and twins have disappeared.

Table 1 shows the Kearns factors FR, FT, and FL as measured after analyzing the textures of various samples in the state following β quenching, following cold rolling and following α annealing:

TABLE 1

| Metallurgical state | Cold rolling reduction ratio (%) | FR | FT | FL |
|---|---|---|---|---|
| After β quenching | 0 | 0.319 | 0.335 | 0.346 |
| After cold rolling | 5 | 0.367 | 0.317 | 0.316 |
|  | 8 | 0.415 | 0.315 | 0.27 |
|  | 12 | 0.475 | 0.293 | 0.232 |
|  | 16 | 0.471 | 0.322 | 0.207 |
| After cold rolling and α annealing | 5 | 0.444 | 0.297 | 0.259 |
|  | 8 | 0.424 | 0.314 | 0.262 |
|  | 12 | 0.478 | 0.332 | 0.19 |
|  | 16 | 0.499 | 0.317 | 0.184 |

In this example, it can be seen that the isotropy of the sample, which was almost perfect after β quenching, was degraded only relatively little by the following cold rolling and α annealing.

Figure 4A:
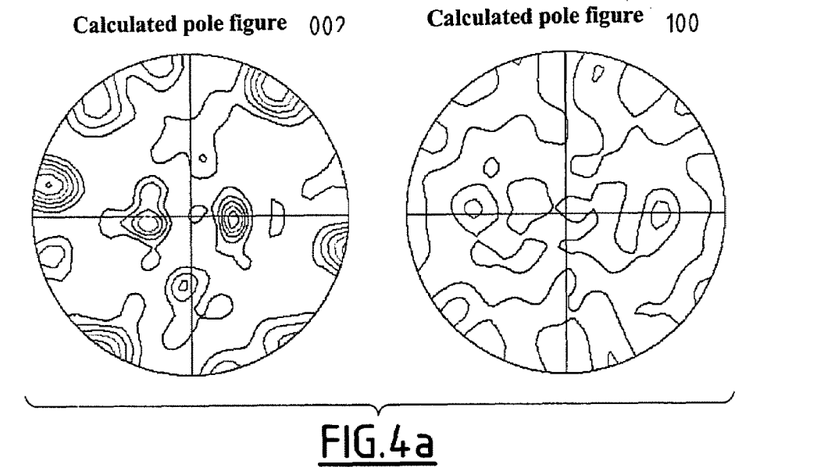
Figure 4B:
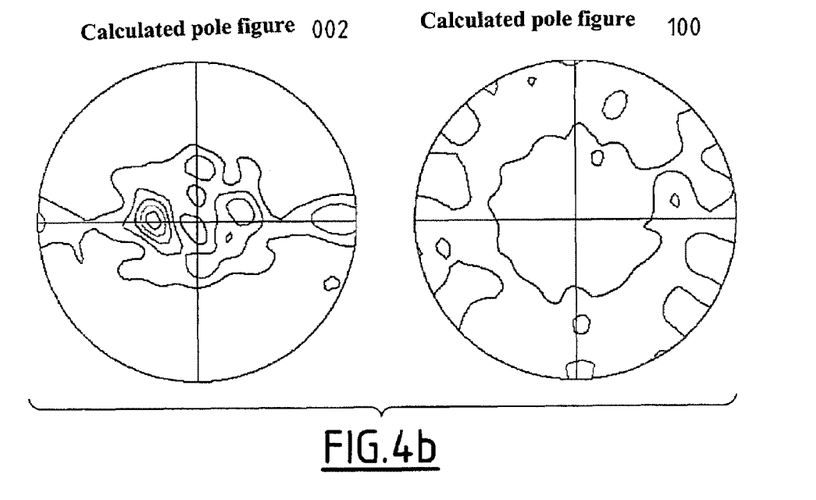

The pole figures of the samples show a few marked poles, including two in the normal-transverse plane at about 30° to the normal direction, and that do not disappear regardless of the reduction ratio of the cold rolling and the annealing conditions. In contrast, there is a significant reduction in the poles on the C axis at 90° to the normal direction as soon as relatively low reduction ratios of 2% are reached, and these poles disappear completely once the reduction ratio is 5%. FIG. 4 shows such pole figures as obtained on samples in the state following β quenching (FIG. 4a) and in the cold rolled state using a reduction ratio of 16% followed by annealing (FIG. 4b).

The structure of the samples in accordance with the invention presents orientations that are more random than in the prior art.

At a reduction ratio of more than 20%, isotropy is too degraded. To ensure that isotropy is satisfactory under all circumstances, it is recommended not to exceed a reduction ratio of 16%.

From the point of view of mechanical properties, comparisons have been made between:
a sample A in accordance with the prior art in that:
its composition was Sn=1.33%, Fe=0.16%; Cr=0.10%; Ni=0.065%; O=0.12%, the balance being Zr and the usual impurities; and
after β quenching it was subjected to α annealing at 750° C. for 3 min; and
a sample B prepared by the method of the invention is that:
its composition was the same as the composition of sample A; and
it was subjected to β quenching, cold rolling at ambient temperature with a reduction ratio of 10%, followed by α annealing at 750° C. for 3 min. Mechanical characterization tests were performed at ambient temperature, and the results are summarized in Table 2.

TABLE 2

|  |  | Sample A (reference) | Sample B (invention) |
|---|---|---|---|
| Traction strength (MPa) | Long direction | 520.7 | 518.0 |
|  | Cross direction | 522.3 | 528.3 |
| Conventional 0.2% elastic limit (MPa) | Long direction | 394.0 | 408.7 |
|  | Cross direction | 411.3 | 445.0 |
| Breaking elongation (%) | Long direction | 24.0 | 24.3 |
|  | Cross direction | 22.1 | 23.0 |
| Roughness Ra (μm) | Long direction | 0.45 | 0.21 |
|  | Cross direction | 0.46 | 0.19 |

From these results, it can be seen that when using the invention, traction strength in the cross direction increases as does breaking elongation, whereas opposite variation is usually observed for those two magnitudes. Furthermore, traction strength in the long direction is not affected in genuinely significant manner by the treatment of the invention.

The invention also makes it possible to reduce the roughness of the sample by half.

It should also be observed that the capacity for bending on a radius of three times the thickness (3e) is not deteriorated by the treatment of the invention.

Other tests consisted in preparing samples having the composition Sn=1.46%; Fe=0.21%; Cr=0.10%; O=0.11%, the balance being zirconium and the usual impurities, and in subjecting them to the following treatment:
cold rolling in the form of a sheet having a thickness of 5.6 mm;
vacuum annealing at 700° C. for 2 h;

cold rolling with a reduction ratio of 50%;

β quenching by vacuum heating in a salt bath at 1030° C. followed either by relatively slow cooling in argon at a speed of about 4° C./min performed in a static oven, or by fast quenching in water, i.e. at a speed greater than 100° C./s;

cold rolling in a single sequence without intermediate annealing and with a reduction ratio of up to 30% depending on the tests; and vacuum annealing for 2 h at 600° C.

As a result of these tests, the following phenomena are provided.

A reduction ratio of more than 20% is liable to lead to surface cracks appearing, if the cooling of the β quenching was slow.

For both techniques taken into consideration for cooling during β quenching, the resulting structures were more heterogeneous with higher cold rolling reduction ratio. The samples that were cooled quickly present recrystallized grains greater than those of the samples that were cooled more slowly.

Concerning the Kearns factors measured on the various samples (raw quenched or after annealing), the results are summarized in Table 3 which also gives the ratio of radius over thickness (R/e) measured during bending tests:

TABLE 3

| Metallurgical state | Cold rolling reduction ratio (%) | FR | FT | FL | R/e |
|---|---|---|---|---|---|
| After β quenching by vacuum heating and cooling in argon | 0 (raw quenched) | 0.429 | 0.287 | 0.284 | 2.55-2.8 |
| | 6.2 | 0.498 | 0.287 | 0.215 | 2.45-2.75 |
| | 10.4 | 0.548 | 0.257 | 0.195 | 2.85-3.15 |
| | 15.4 | 0.493 | 0.303 | 0.204 | 3.55-4.1 |
| | 20.8 | 0.445 | 0.382 | 0.174 | 3.6-4.2 |
| | 29.3 | 0.604 | 0.260 | 0.136 | 3-3.5 |
| After β quenching by heating in a bath of salt and cooling in water | 0 (raw quenched) | 0.352 | 0.324 | 0.324 | 2.17-2.36 |
| | 5.9 | 0.371 | 0.336 | 0.294 | 2.04-2.24 |
| | 8.9 | 0.425 | 0.352 | 0.222 | 1.91-2.02 |
| | 13.7 | 0.338 | 0.193 | 0.193 | 0.92-1.06 |
| | 20.5 | 0.474 | 0.373 | 0.153 | 1.10-1.20 |
| | 27.1 | 0.437 | 0.415 | 0.148 | 0.78-0.91 |

It can be seen that for both types of quenching, the 5 factor FL varies in similar manner, i.e. it represents isotropy that degrades progressively with increasing cold rolling reduction ratio. Above 20% it is considered to be no longer satisfactory, and in order to ensure good isotropy under all circumstances, it is preferable not to exceed 16% or better 10%. Simultaneously, the factors FR and FT vary in random manner.

It can also be seen that the resistance of the samples to nodular corrosion at 500° C. was not influenced by the cold rolling reduction ratio. In contrast, it was influenced significantly by the method of cooling performed during β quenching. The samples that were subjected to a high cooling speed (water quenching) presented a weight gain of about 50 milligrams per square decimeter (mg/dm$^2$), compared with about 175 mg/dm$^2$ for samples that were cooled slowly (in argon). From this point of view, fast cooling is advantageous.

Bending tests were also performed on the samples. A small ratio of R (radius of curvature at which cracks appear) over e (thickness of the sample) is an index of good bending ability. From this point of view, the samples that were subjected to fast cooling during β quenching were better, and their bending ability increased with increasing cold rolling ratio. The samples that were subjected to slow cooling during β quenching were less satisfactory and an increase in the cold rolling reduction ratio tended to degrade their bending ability.

This contradictory influence of reduction ratio on bending ability for the two methods of cooling might be due to the structural differences obtained by those two methods. Slow cooling produces small equiaxed grains in a matrix of coarse needles, whereas fast cooling produces large equiaxed grains in a matrix of fine needles, which is more favorable to the sheet deforming easily.

The positive effects of fast cooling compared with slow cooling at 4° C./min in the example begin to be perceptible for cooling rates of 1° C./s which are easy to achieve industrially, in particular by argon cooling formed by forced convection while the moving sheet is leaving a heated zone.

Furthermore, tests were performed showing that, in the invention, cold rolling after β quenching should be performed in a single sequence, i.e. without any intermediate annealing.

A sheet of composition identical to that of samples A and B described above was rolled hot and then cold to a thickness of 2.56 mm and was subjected to β quenching by heating to 1100° C. in 93 s and cooled at a speed of 3.6° C./s in argon. Thereafter, a reference sample was subjected to first cold roll with a reduction ratio of 8%, an intermediate anneal for 1 h at 700° C., second cold roll at a reduction ratio of 4%, and a final anneal at 700° C. for 1 h. A sample of the same sheet was subjected in accordance with the invention to a single cold rolling operation with a reduction ratio of 12% so as to lead in a single sequence to a product of thickness substantially identical to that of the reference product. That product was subsequently likewise annealed at 700° C. for 1 h.

After final anneal, it was observed that the reference product presented planeness that was not as good as the product prepared in accordance with the invention. From this point of view, the rolling pass with a low reduction ratio (less than 5%) was harmful. In general, in the context of the invention, in order to obtain good planeness, it can be preferable for the first cold rolling pass to be performed with a reduction ratio of at least 5%.

Figure 5A:
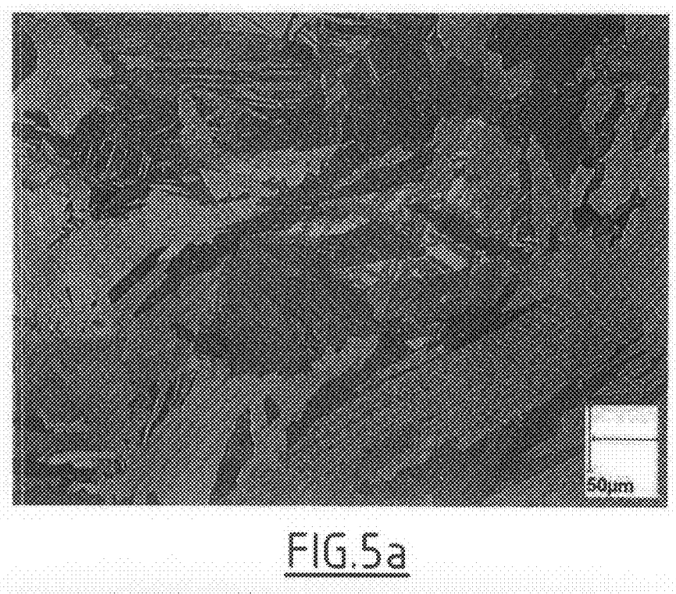

FIG. 5a is a micrograph taken in polarized light of the reference sample after final annealing. Its structure is still acicular with few zones that have been deformed sufficiently to recrystallize, and there remain large areas of parallel platelets.

Figure 5B:
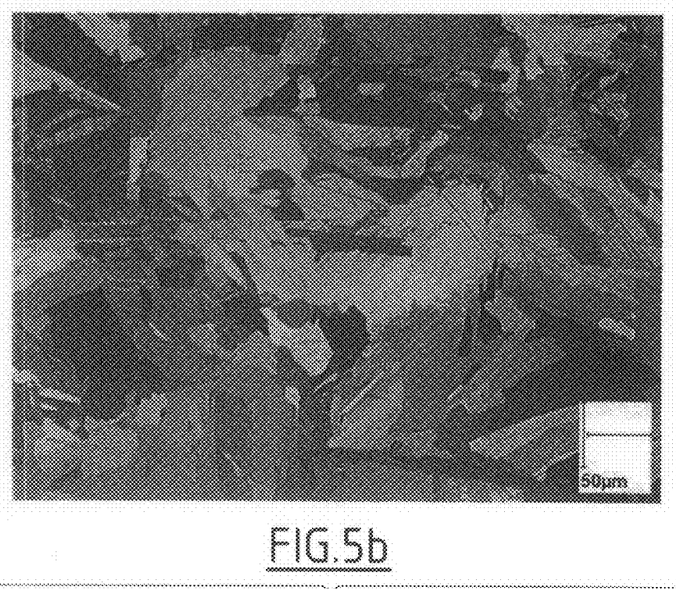

FIG. 5b shows the sample of the invention after final annealing, the micrograph being taken under the same conditions. Recrystallized zones are to be found and no areas of parallel platelets. This treatment in accordance with the invention having no intermediate annealing has thus been shown to be better at breaking the acicular structure obtained after the β quenching.

The Kearns factors of the samples after final annealing are set out in Table 4.

TABLE 4

|  | FR | FT | FL |
|---|---|---|---|
| Reference | 0.458 | 0.341 | 0.201 |
| Invention | 0.450 | 0.348 | 0.202 |

From this point of view, no significant differences are to be observed between the two samples, and these results agree well with those presented above.

Figure 6A:
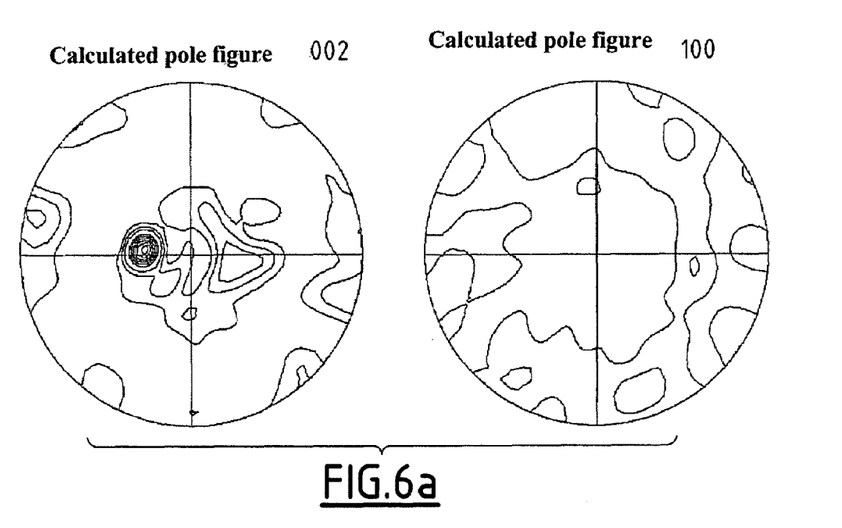
Figure 6B:
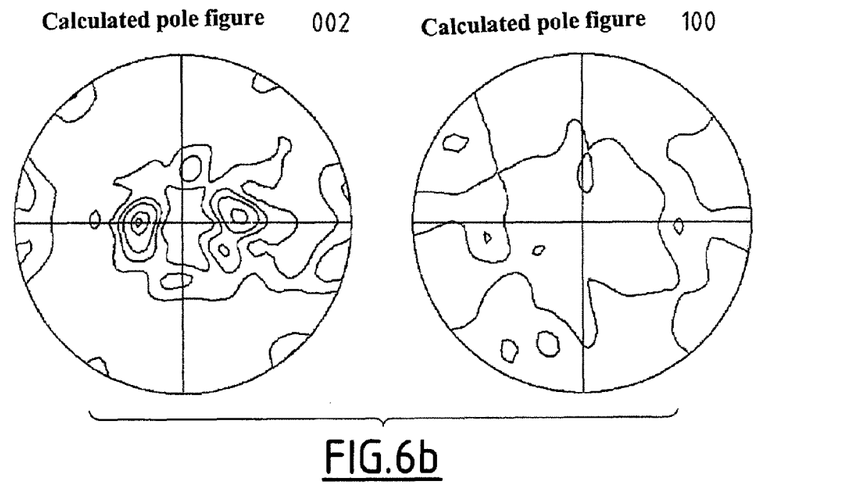

FIG. 6 shows the 002 and 100 calculated pole figures after final annealing for the reference sample (FIG. 6a) and for the sample in accordance with the invention (FIG. 6b). The textures of these samples are intermediate between a quenched state and a conventional recrystallized state, with one or two poles that are very fine and very intense in the normal-transverse plane at about 30° to the normal direction. There are also poles close to the transverse direction and in the longitudinal-transverse plane. The reference sample presents a high degree of asymmetry, and textures that are much more intense than the sample of the invention. These characteristics are unfavorable for isotropy and for stampability of the material. To obtain products that are satisfactory from the point of view of their mechanical properties, it is therefore necessary to avoid proceeding with one or more intermediate anneals between two cold rolling passes after the β quenching. However it is possible to perform cold rolling in a plurality of passes without intermediate anneals, providing the total reduction ratio remains less than or equal to 20%.

One possible explanation for the unfavorable effect of the intermediate anneals is as follows. If a quenched material with an acicular structure is deformed by a few percent, then not all of the needles constituting the grains are deformed, but only those which are in the more favorable orientations relative to the applied deformation. If the material is annealed, these deformed grains will be restored or recrystallized, and will therefore become more deformable. During subsequent deformation they run the risk of deforming preferentially and of preventing the other needles from breaking, thereby impeding the refining of the structure that is sought in the invention.

In contrast, if after the first cold roll an additional cold roll is performed without intermediate annealing, that can break the needles that were not broken in the first roll, particularly since the needles deformed in the first roll have been hardened and have therefore become less deformable.

The looked-for refining of the structure can therefore be obtained, for given reduction ratio, either by a single cold roll serving on its own to break a relatively large number of needles, or else by a succession of cold rolls without intermediate anneals serving to break needles early to a greater or lesser extent depending on their orientations.

Overall, the mechanical properties of flat products (sheets or strips) obtained by the method of the invention make them more deformable and stampable than prior art flat products. They are thus better adapted specifically to fabrication by various forming methods to produce parts for use in making up fuel assemblies for power station nuclear reactors, since otherwise their isotropy is degraded little or not at all compared with flat products of the prior art.

A preferred application of the invention is making boxes for boiling water reactors. Grids and central tubes can also advantageously be obtained using flat products prepared by the method of the invention.

The invention claimed is:

1. A method of fabricating a flat product of zirconium alloy, comprising:
   one of preparing and casting a zirconium alloy ingot containing at least 95% by weight of zirconium, and including impurities and alloying elements;
   shaping the ingot in order to obtain a flat arrangement;
   subjecting the flat arrangement to a β quenching operation under conditions that are determined to obtain within the flat arrangement an acicular structure at an end of the β quenching;
   subjecting the flat arrangement, after the β quenching, to a rolling operation performed in a single rolling sequence without intermediate annealing, the rolling performed at a temperature lying in a range ambient to 200° C., with a reduction ratio lying in a range 2% to 20%; and
   subjecting the rolled flat arrangement to an annealing treatment in the α range or in the α+β range, performed in a temperature range 500° C. to 800° C. for 2 mm to 10 h.

2. A method according to claim 1, wherein the alloy element contents by weight are Sn=1.2% to 1.7%, Fe=0.07% to 0.20%, Cr=0.05% to 0.15%, Ni=0.03% to 0.08%, O=900 ppm to 1600 ppm.

3. A method according to claim 1, wherein the alloy element contents by weight are Sn=1.2% to 1.7%, Fe=0.18% to 0.24%, Cr=0.05% to 0.15%, O=900 ppm to 1600 ppm.

4. A method according to claim 1, wherein the alloy element contents by weight are: Sn=0.5% to 2%, Nb=0.5% to 2%, Fe=0.1% to 0.5%.

5. A method according to claim 1, wherein an alloy element contents by weight are: Sn=0.5% to 2%; Fe=0.1% to 1%; Cr=0.1% to 1.2%.

6. The method according to claim 1, wherein the alloy element contents by weight are: Nb=1.5% to 3.5%; Sn=0.5% to 2%.

7. The method according to claim 1, wherein the rolling following the β quenching is performed with a reduction ratio of 5% to 16%.

8. The method according to claim 7, wherein the rolling following the β quenching is performed with a reduction ratio of 5% to 10%.

9. The method according to claim 1, wherein the cooling of the β quenching is performed at a speed of at least 1° C./s.

10. A zirconium alloy flat product, obtained by the method:
    one of preparing and casting a zirconium alloy ingot containing at least 95% by weight of zirconium, and including impurities and alloying elements;
    shaping the ingot in order to obtain a flat arrangement;
    subjecting the flat arrangement to a β quenching operation under conditions that are determined to obtain within the flat arrangement an acicular structure at an end of the β quenching;
    subjecting the flat arrangement, after the β quenching, to a rolling operation performed in a single rolling sequence without intermediate annealing, the rolling performed at a temperature lying in a range ambient to 200° C., with a reduction ratio lying in a range 2% to 20%; and
    subjecting the rolled flat arrangement to an annealing treatment in the a range or in the α+β range, performed in a temperature range 500° C. to 800° C. for 2 mm to 10 h.

11. The zirconium alloy flat product according to claim 10, wherein the element is formed into a fuel assembly element for a light water reactor.

12. The zirconium alloy flat product according to claim 10, wherein the zirconium alloy flat product is a box for a boiling water nuclear reactor.

13. The zirconium alloy flat product according to claim 10, wherein the zirconium alloy flat product is a grid for one of a boiling water reactor and a pressurized water reactor.

14. The zirconium alloy flat product according to claim 10, wherein the zirconium alloy flat product is a central tube defining, a circulation path.

* * * * *